UNITED STATES PATENT OFFICE.

JOSIAH BROWNING, OF CHICAGO, ILLINOIS.

PAINT COMPOUND.

SPECIFICATION forming part of Letters Patent No. 389,497, dated September 11, 1888.

Application filed February 23, 1888. Serial No. 265,043. (No specimens.)

*To all whom it may concern:*

Be it known that I, JOSIAH BROWNING, a citizen of the United States, and a resident of Chicago, in the county of Cook and State of Illinois, have invented a certain Improved Paint Composition; and I do hereby declare the following to be a full, clear, and exact description of the same, such as will enable those skilled in the art to which my invention pertains to make and use the same.

The purpose of my present improvement is to afford a cheap and efficient paint compound or composition having very effective covering qualities and a durable and lasting nature.

In the manufacture of my improved paint composition I proceed in the following manner: To three gallons each of sulphate-of-zinc and acetate-of-lead solutions, mixed together and standing at 3° Baumé, I add three gallons of soluble glass and six gallons of lime-water saturated. I then take fifty pounds (more or less) of the white iron pigment formed by finely grinding the fibrous mineral body known in the arts as "mineral wool" or "slag cotton," and grind it with two hundred pounds of white oxide of zinc in twenty-six gallons of oil, and, after being thoroughly ground or otherwise incorporated together, I add the above twelve pounds of mixture and intimately mix or grind the whole together.

When thus prepared, the paint composition is ready for shipment or use, and if found too thick for any particular use it can be readily thinned down by the addition of a suitable quantity of turpentine, &c., in the usual manner.

Having thus fully described my said invention, what I claim as new, and desire to secure by Letters Patent, is—

The herein-described composition of matter, consisting of a base of white iron pigment and white oxide of zinc, and a vehicle consisting of sulphate of zinc, acetate of lead, and soluble glass, in about the proportions specified.

Signed at Chicago, Cook county, State of Illinois, this 15th day of February, 1888.

JOSIAH BROWNING.

In presence of—
ROBERT BURNS,
C. MARCHAND.